(12) United States Patent
Eto et al.

(10) Patent No.: US 11,542,880 B2
(45) Date of Patent: Jan. 3, 2023

(54) TWO-STROKE ENGINE FOR WORKING MACHINE AND SERIES HYBRID DEVICE FOR WORKING MACHINE INCORPORATING THE SAME

(71) Applicant: YAMABIKO CORPORATION, Tokyo (JP)

(72) Inventors: Kuniyoshi Eto, Tokyo (JP); Masanori Noguchi, Tokyo (JP); Toshiharu Sawada, Tokyo (JP); Masaru Nozawa, Tokyo (JP); Yuta Kobayashi, Tokyo (JP)

(73) Assignee: YAMABIKO CORPORATION, Tokyo (JP)

( * ) Notice: Subject to any disclaimer, the term of this patent is extended or adjusted under 35 U.S.C. 154(b) by 0 days.

(21) Appl. No.: 17/570,496

(22) Filed: Jan. 7, 2022

(65) Prior Publication Data

US 2022/0220913 A1 Jul. 14, 2022

(30) Foreign Application Priority Data

Jan. 14, 2021 (JP) ............................. JP2021-004370
Oct. 11, 2021 (JP) ............................. JP2021-167079

(51) Int. Cl.
*F02D 41/14* (2006.01)
*F02D 41/04* (2006.01)
(Continued)

(52) U.S. Cl.
CPC ........... *F02D 41/04* (2013.01); *F02D 31/009* (2013.01); *F02D 35/0053* (2013.01);
(Continued)

(58) Field of Classification Search
CPC .. F02D 41/04; F02D 41/1497; F02D 41/2454; F02D 31/009; F02D 35/0053;
(Continued)

(56) References Cited

U.S. PATENT DOCUMENTS 6,289,856 B1  9/2001  Noguchi
9,255,535 B2  2/2016  Larsson
(Continued)

FOREIGN PATENT DOCUMENTS

EP  2947305 A1  11/2015
JP  S63-199103 A  8/1988
(Continued)

OTHER PUBLICATIONS

Extended European Search Report issued in corresponding European Patent Application No. 22151621.4 dated Jun. 15, 2022 (10 pages).

*Primary Examiner* — Hai H Huynh
(74) *Attorney, Agent, or Firm* — Kilyk & Bowersox, P.L.L.C.

(57) ABSTRACT

A two-stroke engine (4) has a throttle motor (22) for driving a throttle valve (20), a fuel injection device (430) disposed in an intake system (18) including a crank chamber (420), and a control unit (24) controlling the throttle motor (22) and the fuel injection device. The two-stroke engine (4) is designed to achieve an engine rotation speed of 4,500 rpm to 7,000 rpm when the throttle valve (20) is fully open. The two-stroke engine (4) is operated with the throttle full open by the control unit (24), and a battery (8) is charged with electric power generated by a generator (6) using the two-stroke engine.

16 Claims, 10 Drawing Sheets

(51) Int. Cl.
*F02D 31/00* (2006.01)
*F02D 35/00* (2006.01)
*F02D 41/24* (2006.01)
*F02P 9/00* (2006.01)

(52) U.S. Cl.
CPC ..... *F02D 41/1497* (2013.01); *F02D 41/2454* (2013.01); *F02P 9/005* (2013.01); *F02D 2200/1012* (2013.01); *F02D 2700/02* (2013.01)

(58) Field of Classification Search
CPC .......... F02D 2200/1012; F02D 2700/02; F02P 9/005
USPC ........................................... 123/73 A, 73 PP
See application file for complete search history.

(56) References Cited

U.S. PATENT DOCUMENTS

| | | | |
|---|---|---|---|
| 2013/0289810 A1* | 10/2013 | Holmes | B60W 10/08 180/65.265 |
| 2018/0194484 A1 | 7/2018 | Livieratos et al. | |
| 2020/0079204 A1 | 3/2020 | Matsuda | |

FOREIGN PATENT DOCUMENTS

| | | |
|---|---|---|
| JP | H7-29831 Y2 | 7/1995 |
| JP | 2004166543 A | 6/2004 |
| JP | 2020000115 A | 1/2020 |

* cited by examiner

TWO-STROKE ENGINE FOR WORKING MACHINE AND SERIES HYBRID DEVICE FOR WORKING MACHINE INCORPORATING THE SAME

BACKGROUND OF THE INVENTION

The present invention relates to a two-stroke engine (hereinafter referred to as "2-st engine") mounted on a working machine, and more specifically, to a 2-st engine suitable for hybridizing a working machine and a series hybrid device for a working machine incorporating the same.

Historically, the 2-st engines were excluded from passenger cars under the exhaust gas regulations tightened year by year, and then also excluded from motorcycles (motorbikes), and today, 4-stroke engines (hereinafter, "4-st engines") account for the great majority of engines of passenger cars and motorcycles.

The working machine is not only essentially required to be small and lightweight, but also has various usage environments, and is tilted or reversed in use. The 2-st engine has a simpler mechanism than the 4-st engine. Particularly, a piston valve type 2-st engine has no valve system components in an engine body and is therefore characterized by high reliability, small size, and light weight. Considering the use form of the working machine, the characteristics of the 2-st engine are suitable for the power source of the working machine. For this reason, the 2-st engines continue to be adopted as a power source for working machines, and historically, the 2-st engines for working machines have evolved in combination with a carburetor. Therefore, the current working machines have a power source made up of a 2-st engine incorporating a carburetor.

The exhaust gas regulations are being tightened year by year for working machines as well. However, the developers of the 2-st engines are constantly developing and putting into practical use the techniques overcoming the exhaust gas regulations. A typical example thereof is a stratified scavenging engine (U.S. Pat. No. 6,289,856) and an electronic control device for a carburetor (U.S. Pat. No. 9,255,535). For weight reduction and simplification, the number of sensors mounted on a working machine is limited, and an electric power generated by a generator is mainly used for ignition of a spark plug.

Passenger cars and motorcycles are becoming more electrified so as to comply with recent exhaust gas regulations. In the working machine industry, many motor-driven types are already on the market. Since the working machine is required to be small and lightweight as described above, a large capacity battery cannot be mounted on the working machine. This problem leads to limited working time. In fact, a commercially available electric working machine is unsuitable for long-time use because the battery runs out after being used for about 30 minutes. Particularly since most of the working machines are used outdoors such as in fields and forests where a charging power source cannot be secured, both electrification and hybridization are limited in terms of widespread use.

In passenger cars, a technique has been proposed for mounting a relatively small battery and extending a cruising distance and has already been put into practical use. A system extending a cruising distance uses an engine exclusively for power generation. A typical example is "e-Power" of Nissan Motor Co., Ltd. The e-Power is a series hybrid system charging a battery with a combination of a 4-st engine and a generator for running only with a motor using this battery as an energy source.

The hybrid system requires an engine, a generator, a motor, and a battery, and has a disadvantage of being large and heavy. This disadvantage is fatal for working machines required to be small-sized and lightweight. However, measures against exhaust emissions are an urgent issue even for working machines. Regarding the power source of the working machine, a hybrid device for a working machine is proposed by U.S. Pat. Nos. 6,289,856, 9,255,535, Japanese Unexamined Utility Model Application Publication No. 4(1992)-19184, and Japanese Laid-Open Patent Publication No. 63(1988)-199103. Although it is not clear whether the engines disclosed in Japanese Unexamined Utility Model Application Publication No. 4(1992)-19184 and Japanese Laid-Open Patent Publication Nos. 63(1988)-199103, 2004-166543, and 2020-115 are 2-st engines or 4-st engines, it can be inferred that the inventors of Japanese Unexamined Utility Model Application Publication No. 4(1992)-19184 and Japanese Laid-Open Patent Publication Nos. 63(1988)-199103, 2004-166543, and 2020-115 proposed hybrid devices for working machines on the assumption of a 4-st engine.

SUMMARY OF THE INVENTION

An object of the present invention is to provide a 2-st engine suitable for hybridization and a series hybrid device for a working machine incorporating the 2-st engine as a power source for a working machine capable of achieving measures against exhaust emissions while maintaining a small size and light weight. More specifically, an object of the present invention is to provide a series hybrid device for a working machine that is small-sized and lightweight and excellent in tilt tolerance and capable of operating for a long time by efficiently and stably taking out engine output and using an electric power stored in a battery as a work drive source while preventing a weight of a drive source portion from becoming heavy.

To solve the technical problems described above, the present inventors use a 2-st engine for hybridization of a power source for a working machine to draw out the merits thereof. Specifically, (1) operational stability during tilting is excellent, and (2) since mixed fuel is used and no oil storage device is not included, a problem of oil leakage does not occur even if the working machine tilts or falls. (3) Since the 2-st engine does not include valve system components in its main body, the structure is simple and an increase in weight can be suppressed.

As compared to the case of adopting a 4-st engine, (i) the 2-st engine does not require energy to drive the valve train. (ii) The 2-st engine is structurally easier to achieve higher compression than the 4-st engine. (iii) The 2-st engine is more compatible with a longer stroke than the 4-st engine. By making a stroke longer, a surface area of a combustion chamber becomes relatively small, so that a cooling loss can be reduced. The thermal efficiency of the 2-st engine can be improved by (ii) and (iii) described above. (iv) Noise, vibration, failure risk, etc. generated by the valve system components can be reduced.

Conventionally, the 2-st engine used for a working machine has a wide rotation speed region including acceleration/deceleration set to correspond to a variety of work forms and workloads, and the entire region has been used. The basic design concept of the conventional 2-st engine is to increase the engine rotation speed so as to obtain higher output during work, and the current 2-st engine has the engine rotation speed (rotation speed in a working region) reaching around 10,000 rpm with the throttle full open. The 2-st engine designers design engines with the entire region including a transient region from an idle region to a high rotation region in mind.

In the present invention, a portion conventionally following various work forms and workloads by changing the engine output itself is replaced with output adjustment by a motor. By continuously operating this 2-st engine in a predetermined throttle fully-opened rotation speed region in which high efficiency is prioritized, a battery can quickly be charged in the most efficient operating state. Since the output from the charged battery can appropriately be changed in accordance with a work situation, a wide range of output from low rotation to high rotation can be applied to the work by the motor without lowering the output efficiency of the engine. Furthermore, the present inventors have found that always operating the 2-st engine with the throttle full open can narrow down the optimization of the engine design to this limited operating state and improve the measures against exhaust emissions, which have been a problem with the conventional 2-st engine. In this way, by achieving hybridization through a change from the conventional engine design concept in which a wide rotation speed region is assumed to a design concept in which only the predetermined rotation speed region for attaching importance on efficiency is used, the fuel consumption rate of the 2-st engine can be reduced, and the most efficient power generation can be performed.

The present inventors then conducted a study on suppressing the engine rotation speed with the throttle full open for the 2-st engine preferable for hybridization. Specifically, by limiting the engine rotation speed in the transient region of the conventional 2-st engine such that, for example, the engine rotation speed with the throttle full open is 4,500 rpm to 7,000 rpm, preferably 5,000 rpm to 6,500 rpm, and more preferably 5,000 rpm to 6,000 rpm, the noise generated by the conventional 2-st engine in the high rotation region can be reduced, and a gas exchange time in a combustion chamber becomes longer, so that an emission amount of an unburned component can be reduced. Furthermore, since the temperature of the main body of the engine decreases as the rotation speed decreases, abnormal wear of the engine and seizure of a piston can be prevented.

Regarding a fuel supply system, as described above, the 2-st engine for a working machine has become widespread in combination with a carburetor equipped with holes for fuel sucked by the negative pressure of the engine, and electronic control of the carburetor for a countermeasure against exhaust gas has become widespread to this day. The present inventors focus on the fact that a fuel injection device can be used instead of this carburetor to provide precise A/F control of an air-fuel mixture, which is the characteristics of the fuel injection device. By controlling the fuel injection device, the A/F of the air-fuel mixture and the fuel injection timing can be controlled freely and quickly so as to not only improve the measures against exhaust emissions, but also freely increase and decrease the engine output by the A/F of the air-fuel mixture.

According to the present invention, the technical problems described above are solved by basically providing a two-stroke engine for a working machine in a series hybrid device that includes an internal combustion engine, a generator connected to the internal combustion engine, a battery for storing electric power generated by the generator, and one or more motors operating with electric power supplied from the battery and that constitutes a power source for a working machine, the two-stroke engine constituting the internal combustion engine incorporated in the series hybrid device, the two-stroke engine comprising:

a throttle motor for driving a throttle valve disposed in an intake system;

a fuel injection device disposed in the intake system including a crank chamber and injecting fuel into the intake system; and a control unit controlling the throttle motor and the fuel injection device, wherein the two-stroke engine is designed to achieve an engine rotation speed of 4,500 rpm to 7,000 rpm with a state where the throttle valve is fully opened, wherein the two-stroke engine is operated with the throttle full open by the control unit, and wherein the battery is charged with electric power generated by the generator using the two-stroke engine. As used herein, the term of "throttle full open" is not limited to the state where the throttle valve is fully opened and includes a valve position adjustment of slightly closing the throttle valve from the completely full open state for adjustment of the engine output when the throttle valve is fully opened. Therefore, the term of "throttle full open" means not only the completely full open state of the throttle valve but also the almost fully-opened state thereof.

The advantages and further objects of the present invention will become apparent from the following detailed description of preferred embodiments.

DETAILED DESCRIPTION OF THE PRESENT INVENTION

Preferred embodiments of the present invention will now be described with reference to the accompanying drawings.

Figure 1:
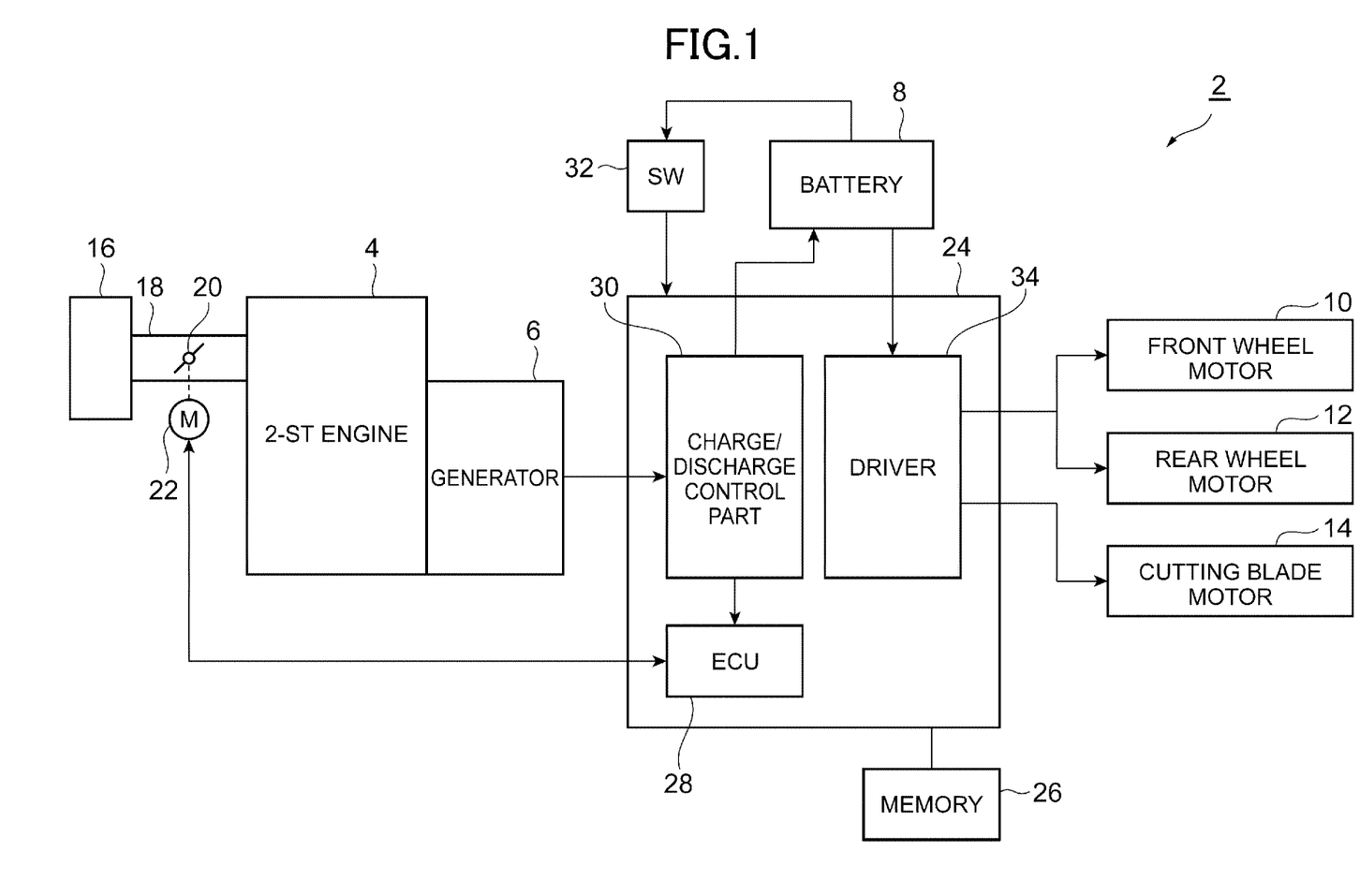
FIG. 1 shows an overall configuration diagram of a series hybrid device of an embodiment that is a power source of a ridge mowing robot, for example.

FIG. 1 is an overall configuration diagram of a series hybrid device 2. The series hybrid device 2 is applied to a power source of a ridge mowing robot. The series hybrid device 2 includes a 2-st engine 4 and a generator 6 mechanically coupled to the 2-st engine 4. An electric power generated by the generator 6 is stored in a battery 8, and a front wheel motor 10, a rear wheel motor 12, and a cutting blade motor 14 are driven by using the electric power stored in the battery 8. Therefore, the ridge mowing robot incorporating the series hybrid device 2 has the power source made up of the 2-st engine 4, the battery 8 charged with the electricity generated by the generator 6, and the motors 10, 12, 14 operating with this electric power, and this power source is used for causing the ridge mowing robot to move and work.

The 2-st engine 4 has an intake system 18 including an air cleaner 16, and an amount of air is increased or decreased by a throttle valve 20 arranged in the intake system 18, so that an engine output is controlled. The throttle valve 20 is opened and closed by a throttle motor 22.

The series hybrid device 2 has a control unit 24. The control unit 24 is made up of, for example, a microcomputer, and the control unit 24 operates in accordance with a program stored in a memory 26. The control unit 24 includes an ECU 28 controlling the throttle motor 22, and the ECU 28 has a function of electronically controlling the throttle valve 20.

The control unit 24 has a charge/discharge control part 30, and the charge/discharge control part 30 includes a rectifier regulator. An electric power generated by the generator 6 is controlled by the charge/discharge control part 30 to store electricity in the battery 8 and drives the ECU 28.

The electric power stored in the battery 8 is supplied to the control unit 24 via a main switch 32 and is also used to drive the front wheel motor 10, the rear wheel motor 12, and the cutting blade motor 14 via a driver 34.

The operation of the ridge mowing robot can roughly be divided into three sections. In a first section, the ridge mowing robot moves to a working place. In a second section, the ridge mowing robot performs a mowing work while running in the working place. In a third section, when the work is completed, the ridge mowing robot moves to a storage place.

In the first and third sections, the front wheel motor 10 and the rear wheel motor 12 of the ridge mowing robot operate. The front wheel motor 10 and the rear wheel motor 12 are operated by the electric power supplied from the battery 8 as described above.

In the second section, the ridge mowing robot performs a mowing work while moving in the working place. In this second section, in addition to the front wheel motor 10 and the rear wheel motor 12 serving as running motors, the cutting blade motor 14 operates as a working motor. The operations of the front wheel motor 10, the rear wheel motor 12, and the cutting blade motor 14 are all performed by the electric power supplied from the battery 8 as described above.

The 2-st engine may be operated to charge the battery 8 at a timing while the front wheel motor 10 and the rear wheel motor 12 are operating as the running motors in the first and third sections, while any of the front wheel motor 10, the rear wheel motor 12, and the cutting blade motor 14 serving as the working motor is operating in the second section, or while the ridge mowing robot is actually running or working in the first, second or third section. The 2-st engine 4 is preferably operated with the throttle full open immediately after the engine is started.

The application of the series hybrid device 2 described with reference to FIG. 1 is not limited to the ridge mowing robot. The ridge mowing robot is merely an example of application of the series hybrid device 2. The application of the series hybrid device 2 may be, for example, a running robot for spraying pesticides, a self-propelled blower, or a self-propelled vacuum device. Therefore, the number of the running and working motors 10, 12, 14 included in the series hybrid device 2 is not limited to three. The motor operated by the electric power supplied from the battery 8 may be only one running motor, or multiple working motors may be included. The number of running motors or working motors is any number depending on the function of the working machine to which the device is applied.

Figure 2:
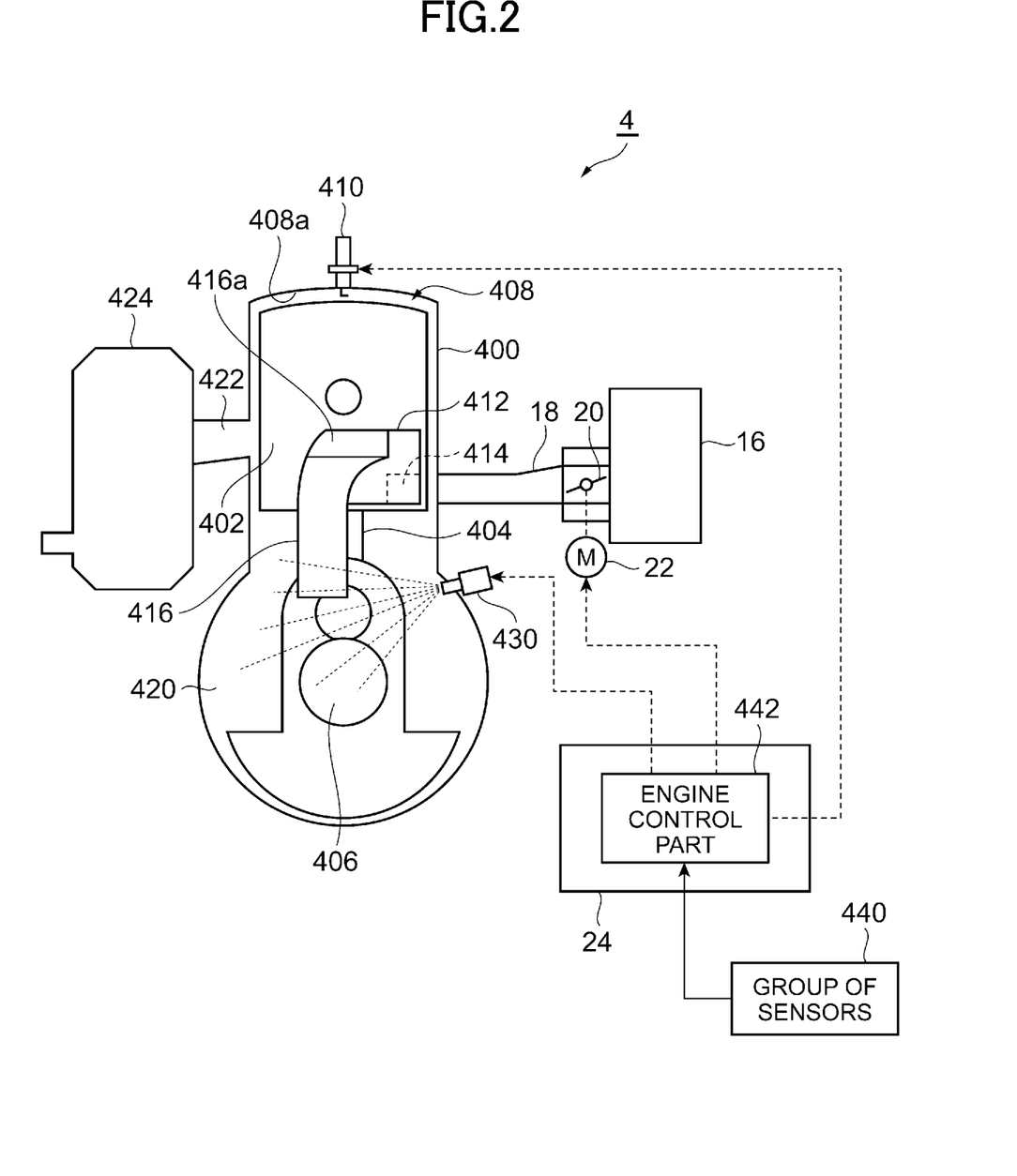
FIG. 2 shows a vertical cross-sectional view of a two-stroke engine incorporated in the series hybrid device of the embodiment.
Figure 3:
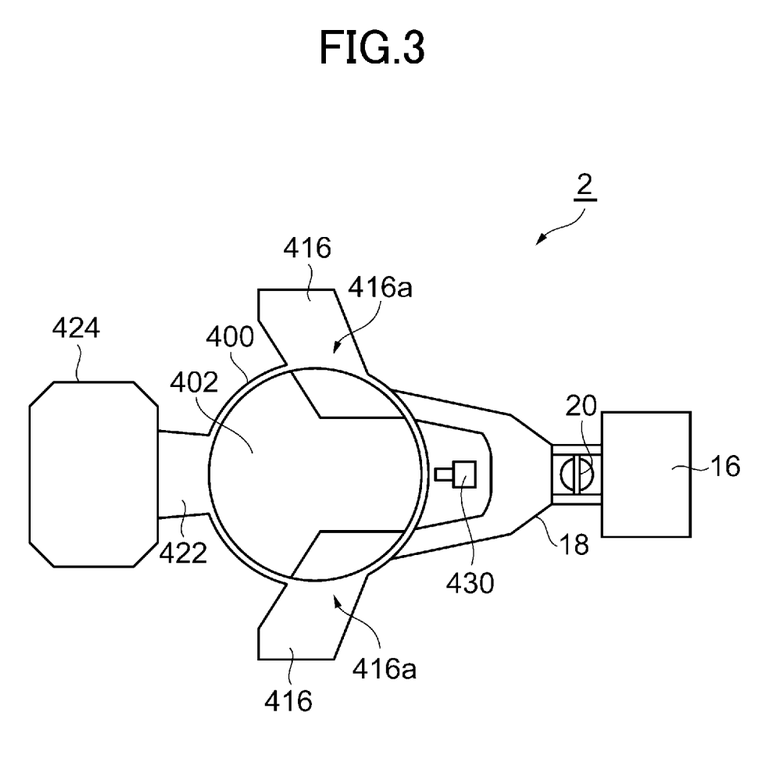
FIG. 3 shows a plan view of the two-stroke engine of FIG. 2 and is a view in which a top portion of a cylinder is not shown.

FIGS. 2 and 3 are diagrams for explaining the outline of the 2-st engine 4 suitably applicable to the series hybrid device 2 according to the present invention. FIG. 2 is a vertical cross-sectional view of the 2-st engine 4 of the embodiment, and FIG. 3 is a plan view. In FIG. 3, a cylinder head portion constituting a top surface of a combustion chamber is not shown.

With reference to FIGS. 2 and 3, the 2-st engine 4 is an air-cooled engine and a single-cylinder engine. The 2-st engine 4 is a piston valve type, and a scavenging port, an exhaust port, etc. described later are opened and closed by a piston.

The 2-st engine 4 has a piston 402 fitted into a cylinder 400 as in the conventional case so that the piston 402 reciprocates between the top dead center and the bottom dead center, and this reciprocating motion is transmitted through a connecting rod 404 to a crankshaft 406 and is converted into a rotary motion by the crankshaft 406 and output.

A spark plug 410 is disposed to face a combustion chamber 408 defined by the piston 402. The combustion chamber 408 is made up of a flat dome-shaped combustion chamber. Therefore, a top surface 408a of the combustion chamber 408 has a flat dome shape. The spark plug 410 is disposed at the top of the flat dome-shaped combustion chamber 408.

The 2-st engine 4 is a stratified scavenging engine. In the figure, reference numeral 412 denotes a piston groove. The piston groove 412 is formed on a circumferential surface of the piston 402 and has a function of allowing an intake port 414 leading to the intake system 18 to communicate with an upper portion of each scavenging passage 416 so as to fill the upper portion of the scavenging passage 416 with air supplied from the intake system 18. The air filled in the scavenging passage 416 is supplied to the combustion chamber 408 as leading air at the beginning of a scavenging stroke.

The 2-st engine 4 has the scavenging passages 416. The scavenging passages 416 communicate with the combustion chamber 408 and a crank chamber 420 in the scavenging stroke to supply an air-fuel mixture pre-compressed in the crank chamber 420 to the combustion chamber 408.

The 2-st engine 4 has an exhaust port 422 formed in the cylinder 400 as in the conventional case, and the exhaust port 422 leads to a muffler 424. The exhaust port 422 is opened and closed by the piston 402.

In the stratified scavenging engine 4, the leading air is first discharged from a scavenging port 416a in the scavenging stroke, and the air-fuel mixture pre-compressed in the crank chamber 420 is then discharged. The leading air and the air-fuel mixture discharged from the scavenging port 416a are directed to the side opposite to the exhaust port 422.

Fuel is supplied to the 2-st engine 4 by a fuel injection valve 430 instead of a conventional carburetor. The fuel injection valve 430 may be arranged in the combustion chamber 408, the intake system 18, or the crank chamber 420. When the fuel injection valve 430 is arranged in the crank chamber 420, the fuel injection valve 430 may be arranged at or near an inlet portion, i.e., a lower end opening portion, of the scavenging passage 416.

A mixed fuel containing lubricating oil is injected from the fuel injection valve 430, and the inside of the engine is lubricated with the lubricating oil contained in the mixed fuel. An air-fuel ratio (A/F) of the air-fuel mixture supplied to the engine is controlled by the fuel injection time of the fuel injection valve 430.

The 2-st engine 4 may have a short stroke or is preferably a square stroke engine or a long stroke engine having a bore stroke ratio of 1 or more. Specifically, the bore stroke ratio of the 2-st engine 4 is set to 0.8 to 1.3, preferably 1.0 to 1.2. With this configuration, an excessive rotation speed is not required during operation, and therefore, an engine capable of efficient output at a predetermined rotation speed lower than that of the conventional engine can be implemented.

The 2-st engine 4 is preferably designed such that when the throttle valve 20 is fully opened, the rotation speed is 4,500 to 7,000 rpm, preferably 5,000 to 6,000 rpm. This rotation speed is much lower than the rotation speed in the working region of the conventional 2-st engine. By designing the maximum rotation speed of the 2-st engine 4 to be lower than that of the conventional engine, engine noise can be reduced, and the optimum design is easily achieved for the timing of opening the scavenging port 416a, the exhaust port 422, etc.

The 2-st engine 4 is preferably designed to have an engine compression ratio of 8 to 16, and the 2-st engine 4 is more preferably designed to have a high compression ratio of 12 to 16. As described above, since the combustion chamber 408 of the 2-st engine 4 is a flat dome-shaped combustion chamber, it is structurally easier to achieve higher compression as compared to the 4-st engine. With this configuration, while the merits of a lightweight small-sized engine are maintained and the rotation speed is suppressed as compared to the conventional engine, a higher engine output can be provided.

According to the series hybrid device 2 of the embodiment, the 2-st engine 4 using the mixed fuel containing the lubricating oil is adopted. Since an oil chamber is not disposed, the problem of oil leakage does not occur even if the ridge mowing robot tilts or falls. Regarding the timing of power generation by the generator 6, i.e., the operation of the 2-st engine 4, the 2-st engine 4 can be started at any time while the front wheel motor 10, the rear wheel motor 12, or the cutting blade motor 14 is preferably operating and the ridge mowing robot is running and/or working. Therefore, when charging is required, a required amount of charge can be achieved regardless of which motor is driven or the form of working. By designing the 2-st engine 4 such that the engine rotation speed is preferably 4,500 to 7,000 rpm, preferably 5,000 to 6,000 rpm when the throttle is fully open, noise and vibration associated with the operation of the 2-st engine 4 can be reduced. Additionally, since the engine always operates with the throttle full open, the output adjustment (tuning) of the 2-st engine 4 becomes easy.

The thermal efficiency of the engine can further be improved by using a square stroke engine or a long stroke engine in which the bore stroke ratio of the 2-st engine 4 incorporated in the series hybrid device 2 is 1 or more. The thermal efficiency of the engine can further be improved by forming the combustion chamber 408 of the 2-st engine 4 as a flat dome-shaped combustion chamber to increase the engine compression ratio.

By adopting the fuel injection valve 430 and adopting the electronically-controlled throttle valve 20 in the 2-st engine 4 incorporated in the series hybrid device 2, while the 2-st engine 4 is always operated with the throttle fully or nearly fully open, the engine output can precisely be controlled by controlling the A/F of the air-fuel mixture by the fuel injection valve 430 without increasing an intake loss. The control of the engine output is not limited to the A/F control of the air-fuel mixture by the fuel injection valve 430 and can also be provided by controlling the ignition timing. Specifically, the output of the 2-st engine 4 always operating with the throttle full open during power generation can be controlled by (i) A/F control of the air-fuel mixture, (ii) ignition timing control, and (iii) a combination of the A/F control of the air-fuel mixture and the ignition timing control.

With reference to FIG. 2, those skilled in the art will notice the absence of a recoil starter. The recoil starter is used to manually start a working machine engine. In the 2-st engine 4 incorporated in the series hybrid device 2, the generator 6 is used as an engine starting motor by supplying electric power from the battery 8 to the generator 6.

Based on flowcharts of FIG. 4 and the subsequent figures, some specific control examples related to the 2-st engine 4 incorporated in the series hybrid device 2 will be described. In FIG. 2, reference numeral 440 denotes a group of sensors. The sensor group 440 includes an engine rotation speed sensor detecting the engine rotation speed of the 2-st engine 4, a crank angle sensor detecting a crank angle of the crank shaft 406, an intake air temperature sensor detecting an intake air temperature (environmental temperature), a rainfall sensor detecting rainfall, a battery remaining amount sensor detecting a remaining amount of the battery 8, a power consumption sensor detecting a power consumption of the battery 8, a charging power sensor detecting a charging power of the battery 8, a robot posture sensor detecting the posture of the ridge mowing robot, etc., and the robot posture sensor detects the tilt and fall of the ridge mowing robot. The signals of the sensor group 440 are input to an engine control part 442. The engine control part 442 constitutes a portion of the control unit 24, and the ECU 28 described with reference to FIG. 1 constitutes a portion of the engine control part 442.

The engine control part 442 outputs a throttle valve opening degree signal to the throttle motor 22, a fuel injection signal to the fuel injection valve 430, and an ignition signal to the spark plug 410. The electric power to the spark plug 410 is supplied from the battery 8.

<Charging of Battery 8>

Figure 4:
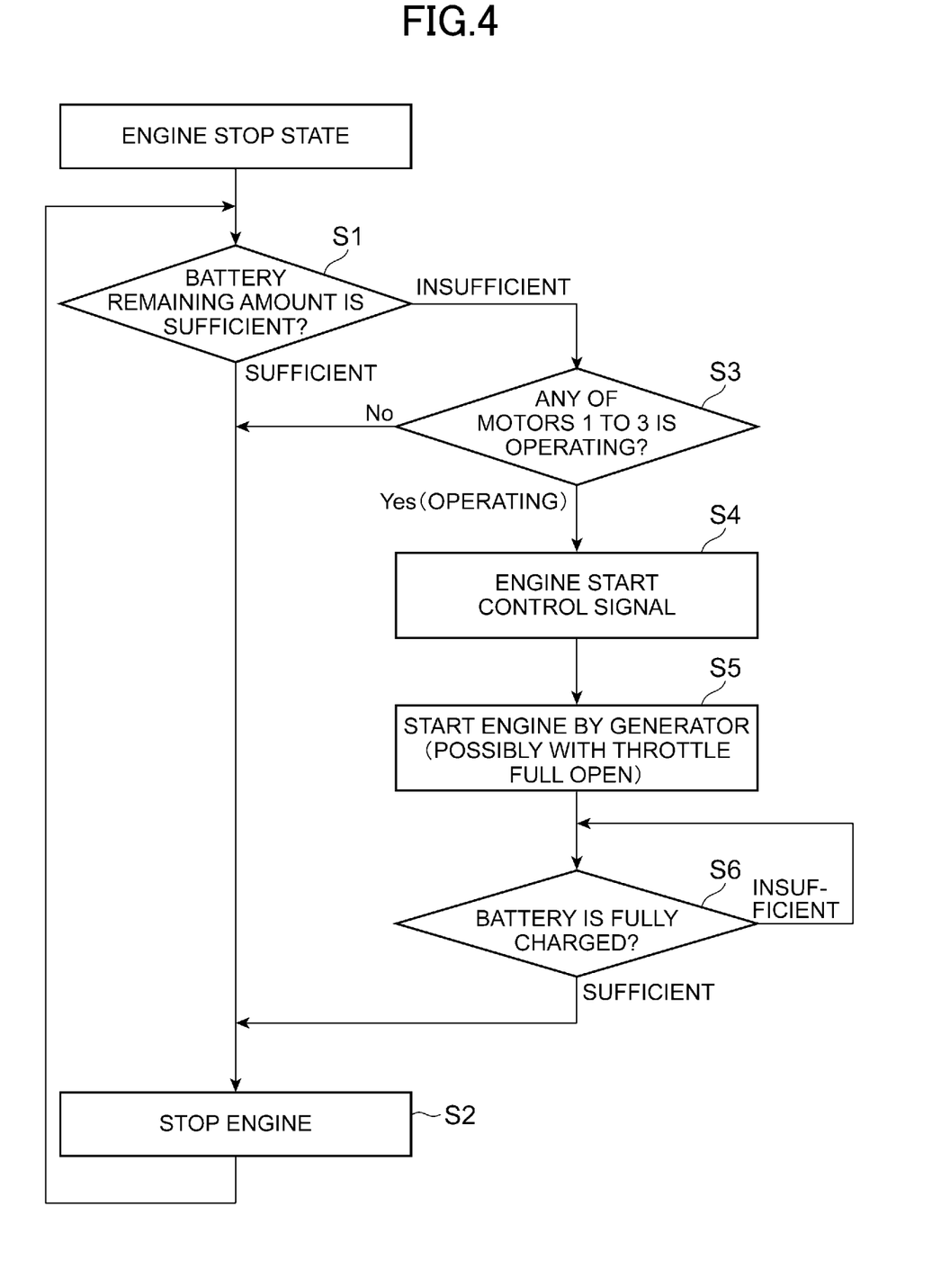
FIG. 4 shows a flowchart for explaining a process related to starting the two-stroke engine and charging a battery.

FIG. 4 is a flowchart for explaining processes related to the start of the 2-st engine 4 and the charging of the battery 8. With reference to the flowchart of FIG. 4, in step S1, it is determined whether the remaining amount of the battery 8 is sufficient based on the signal from the battery remaining amount sensor, and when the battery remaining amount is sufficient, the process goes to step S2, and an engine stop state is maintained. When it is determined in step S1 that the battery remaining amount is not sufficient, the process goes to step S3 to determine whether any one of the front wheel motor 10, the rear wheel motor 12, and the cutting blade motor 14 is operating, and an engine start control signal is generated on the premise that any one of the front wheel motor 10, the rear wheel motor 12, and the cutting blade motor 14 is operating, and the 2-st engine 4 is started (S4, S5). In step S5, the 2-st engine 4 is started by the generator 6 as described above. The electric power is supplied from the battery 8 to the generator 6 based on the engine start control signal, and the generator 6 functions as an engine starting motor to start the 2-st engine 4. When the 2-st engine 4 is started, the throttle valve 20 may be positioned at a starting position or at a throttle full-open position. When the 2-st engine 4 is started, the 2-st engine 4 operates with the throttle full open, the generator 6 starts power generation by the output of the engine 4, and the battery 8 is charged with the generated electric power. The charging by the 2-st engine 4 and the generator 6 is continued until the battery 8 is charged to a predetermined amount (not necessarily fully charged) (S6). During charging, the 2-st engine 4 continues to operate with the throttle full open. When the battery 8 is fully charged, the process goes to step S2 and the engine 4 is stopped.

<Control of Abnormal Combustion of Engine>

Figure 5:
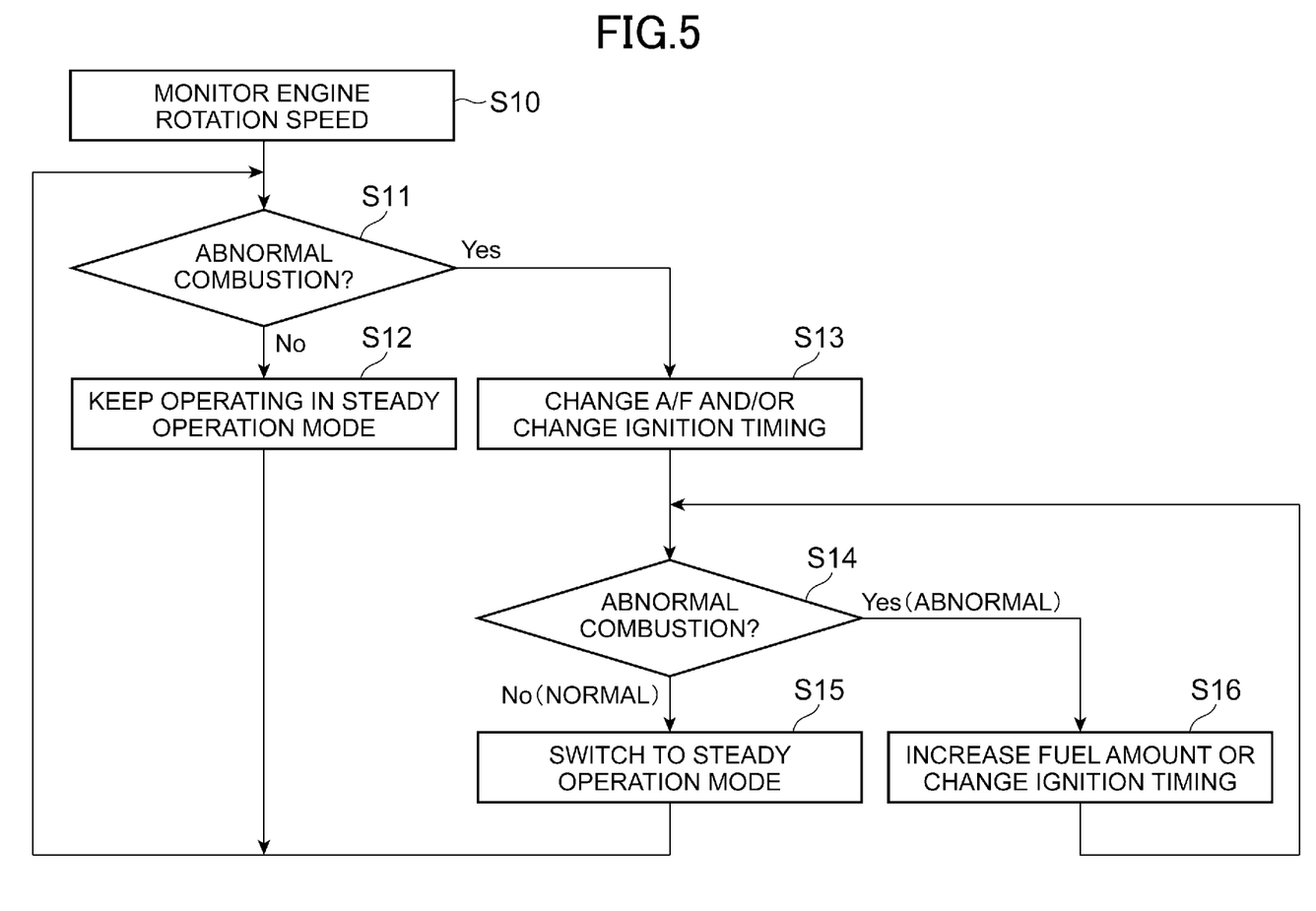
FIG. 5 shows a flowchart for explaining a process related to abnormal combustion of the two-stroke engine.

FIG. 5 is a flowchart for explaining a process related to abnormal combustion of the 2-st engine 4. In step S10, the engine rotation speed of the 2-st engine 4 operating with the throttle full open is monitored. This monitoring of the engine rotation speed is periodically continued while the 2-st engine 4 is operating. In next step S11, it is determined whether the abnormal combustion of the 2-st engine 4 has occurred based on the engine rotation speed. For example, if a phenomenon such as abnormal fluctuation of the engine rotation speed, abnormal rise of the engine rotation speed, or abnormal drop of the engine rotation speed has not occurred, the process goes to step S12 to control the 2-st engine 4 kept in a steady operation mode and the 2-st engine 4 continues to operate with the throttle full open.

When it is determined in step S11 that the phenomenon of abnormal combustion has occurred, the process goes to step S13 for transition from the steady operation mode to an abnormal combustion mode in engine control. A/F change, ignition timing change, etc. are performed for dealing with abnormal combustion in the abnormal combustion mode, and if the end of abnormal combustion can be confirmed in next step S14, the process goes to step S15 and the control of the 2-st engine 4 is returned to the steady operation mode. In step S14, when the abnormal combustion continues, the process goes to step S16 to maintain the abnormal combustion mode, and the process of step S16 is repeated until the abnormal combustion ends (S16, S14).

<Process Related to Suitability of Environment of Ridge Mowing Robot>

If the usage environment of the ridge mowing robot is not suitable for charging the battery 8, the control of forcibly stopping the charging is provided. With reference to the flowchart of FIG. 6, first, when it is confirmed in step S20 that the engine is in the stopped state, it is determined in next step S21 whether the remaining amount of the battery 8 is sufficient, and when the remaining amount of the battery is sufficient, the process goes to step S22, and the engine stopped state is continued. When it is determined in step S21 that the remaining amount of the battery 8 is insufficient, the process goes to step S23 to determine whether the usage environment of the working machine, i.e., the ridge mowing robot, is suitable.

Figure 6:
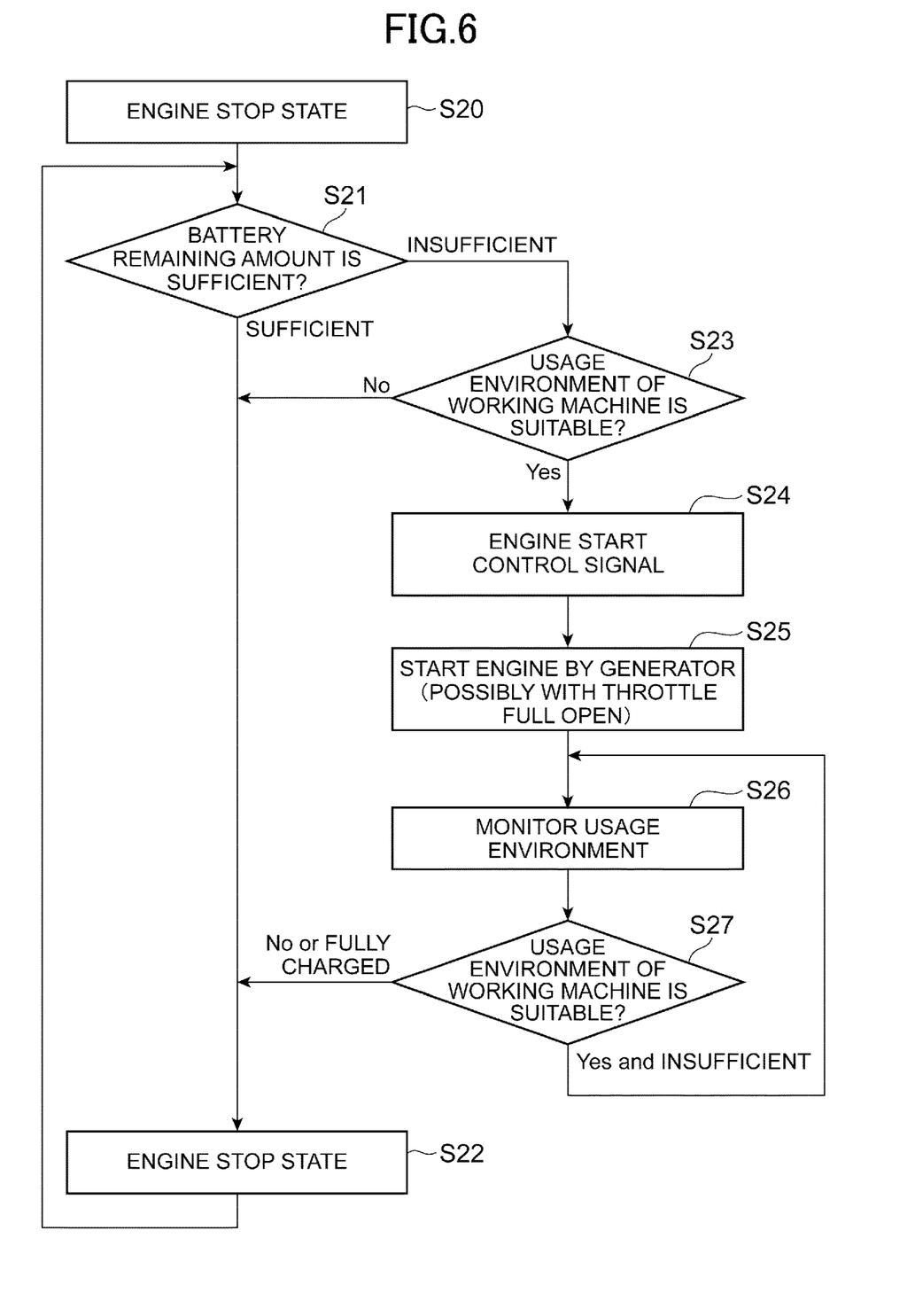
FIG. 6 shows a flowchart for explaining an example of a process of forcing a charging prohibition when the usage environment of the ridge mowing robot is not suitable for charging the battery.

Unsuitable usage environment of the ridge mowing robot means, for example, over-turning of the ridge mowing robot, the environmental temperature of, for example, 0° C. or less, rainfall, indoors, etc., and in step S23, when the usage environment of the ridge mowing robot is unsuitable, the process goes to step S22, and the engine stopped state is continued even if the battery remaining amount is insufficient. In step S23, when the usage environment of the ridge mowing robot is suitable, an engine start control signal is generated in step S24, and the 2-st engine 4 is started based on this engine start control signal. The 2-st engine 4 is started (S25) by using the generator 6 as an engine starting motor as described above. When the 2-st engine 4 is started, the generator 6 starts power generation under the original power generation function with the output of the engine 4 operating with the throttle full open, and the battery 8 is charged with the generated electric power.

While the battery 8 is being charged by the full-throttle operation of the 2-st engine 4, the monitoring of the usage environment of the ridge mowing robot is continued (S26), and in next step S27, for example, when over-turning of the ridge mowing robot is detected, the process goes to step S22 even if the battery 8 is insufficiently charged, and the operation of the 2-st engine 4 is forcibly stopped.

If the usage environment of the ridge mowing robot is suitable, the full-throttle operation of the 2-st engine 4 is continued until the battery 8 is fully charged (S27, S26), and when the battery 8 is fully charged, the 2-st engine 4 is stopped (S22).

<Adjustment of Engine Output>

The output of the 2-st engine 4 is adjusted by comparing the power consumption of the battery 8 with the charging power of the generator 6 and controlling the A/F of the air-fuel mixture and/or the ignition timing as necessary. This control will be described with reference to the flowchart of FIG. 7.

Figure 7:
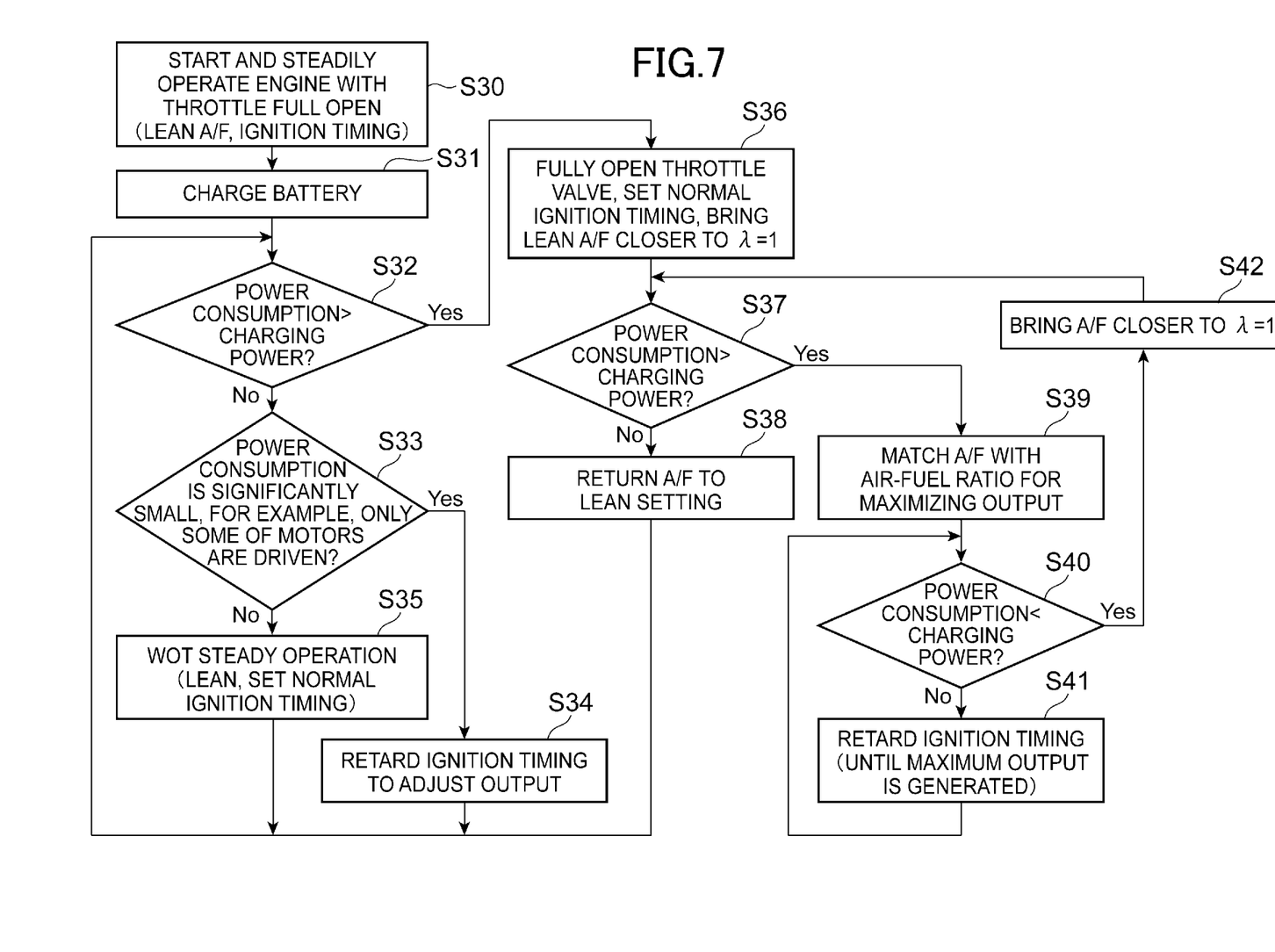
FIG. 7 shows a flowchart for explaining an example of control for adjusting an engine output during battery charging.

In step S30, the operation of the 2-st engine 4 is performed. In the engine 4, the throttle is fully opened, the air-fuel ratio of the mixed fuel discharged from the fuel injection valve 430 is lean, and the operation of the 2-st engine 4 is controlled under the ignition timing suitable for steady operation. The generator 6 generates electric power by the operation of the engine 4, and the battery 8 is charged with the generated electric power (S31).

In next step S32, the power consumption of the battery 8 is compared with the charging power, and when the power consumption is smaller, the process goes to step S33, and when the power consumption is significantly small, for example, when only some of the front wheel motor 10, the rear wheel motor 12, and the cutting blade motor 14 is operating, the process goes to step S34 to perform a process of retarding the ignition timing. As a result, an adjustment is made to reduce the engine output, and the power generation capacity of the generator 6 can be reduced.

In step S33, when the power consumption of the battery 8 is comparatively large although the power consumption is smaller than the charging power, for example, when the front wheel motor 10, the rear wheel motor 12, and the cutting blade motor 14 are all operating, the process goes to step S35 to continue the steady operation of the 2-st engine 4 with the throttle full open and the ignition timing suitable for steady operation with the lean air-fuel ratio of the mixed fuel discharged from the fuel injection valve 430.

In step S32, when the power consumption of the battery 8 is larger than the charging power, a process of bringing the air-fuel ratio of the mixed fuel closer to a stoichiometric ratio ($\lambda=1$) is performed in step S36 with continuing the ignition timing suitable for steady operation with the throttle full open. As a result, the full-throttle engine output can be increased to further increase the power generation capacity of the generator 6.

In next step S37, it is determined whether the power consumption of the battery 8 is larger than the charging power, and if the power consumption of the battery 8 becomes lower, the process goes to step S38 to perform a process of making the air-fuel ratio of the mixed fuel lean again. As a result, the full-throttle engine output can be reduced and the power generation capacity of the generator 6 can be returned to a normal level.

In the step S37, when the power consumption of the battery 8 is larger than the charging power, the process goes to step S39, and a process is performed for matching the air-fuel ratio of the mixed fuel discharged from the fuel injection valve 430 with the air-fuel ratio at which the output of the engine 4 can be maximized, with the throttle full open and the ignition timing suitable for steady operation. As a result, the full-throttle engine output can be increased to increase the power generation capacity of the generator 6.

In next step S40, it is determined whether the power consumption of the battery 8 is smaller than the charging power, and if the power consumption is still larger, the process goes to step S41 to perform a process of advancing the ignition timing. In this ignition timing adjustment process, the ignition timing is advanced such that the output of the engine 4 can be maximized. As a result, the engine output can be increased to further increase the power generation capacity of the generator 6.

After the ignition timing advancing process in step S41, the process returns to step S40, and when the power consumption of the battery 8 becomes smaller than the charging power, the process goes to step S42 to perform a process of bringing the air-fuel ratio of the mixed fuel discharged from the fuel injection valve 430 closer to λ=1, and the process goes to step S37. As a result, the full-throttle engine output is gradually reduced, and the power generation capacity of the generator 6 can be returned to the normal level.

Figure 8:
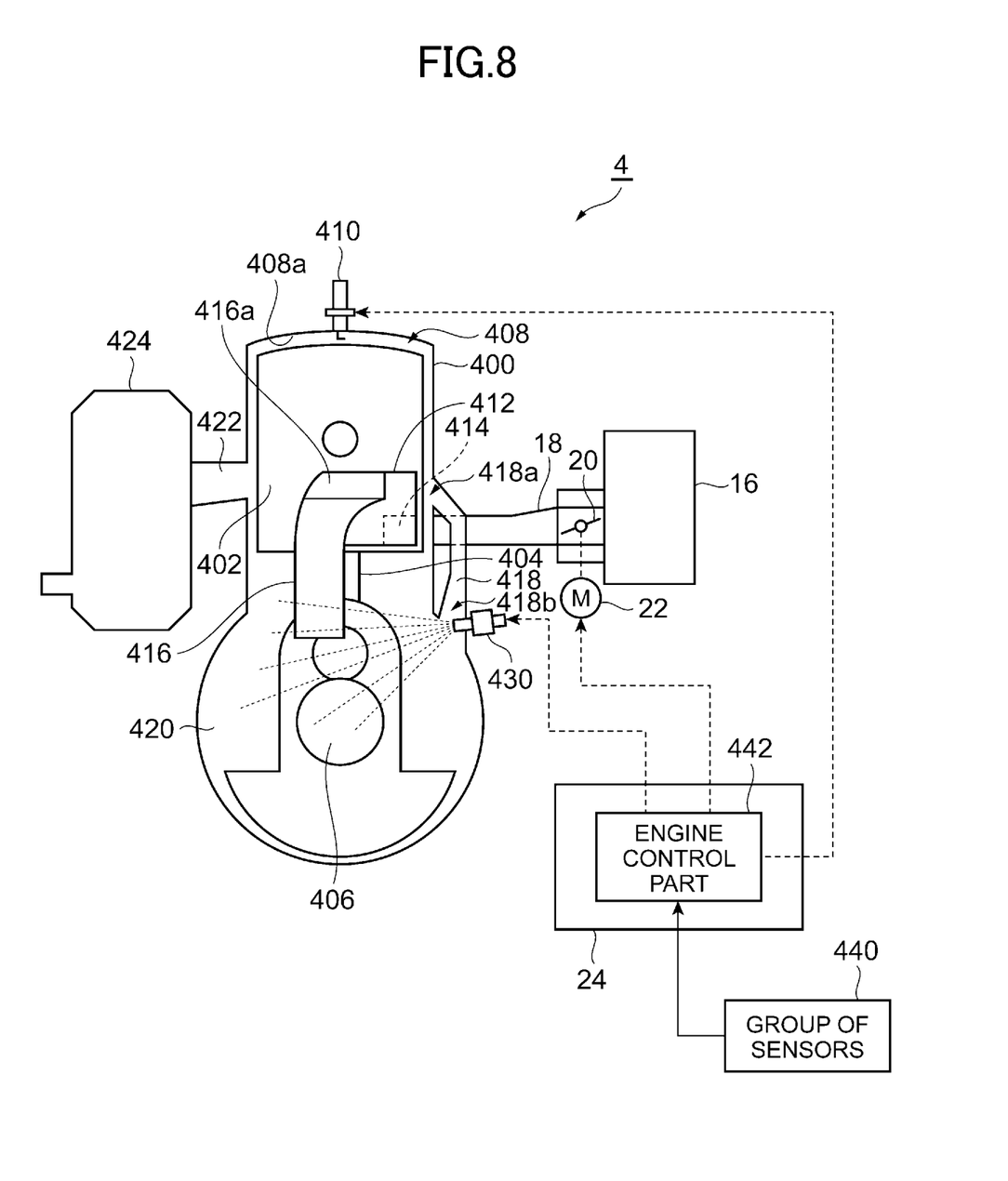
FIG. 8 shows a vertical cross-sectional view of an engine having a booster port and is a view corresponding to FIG. 2.
Figure 9:
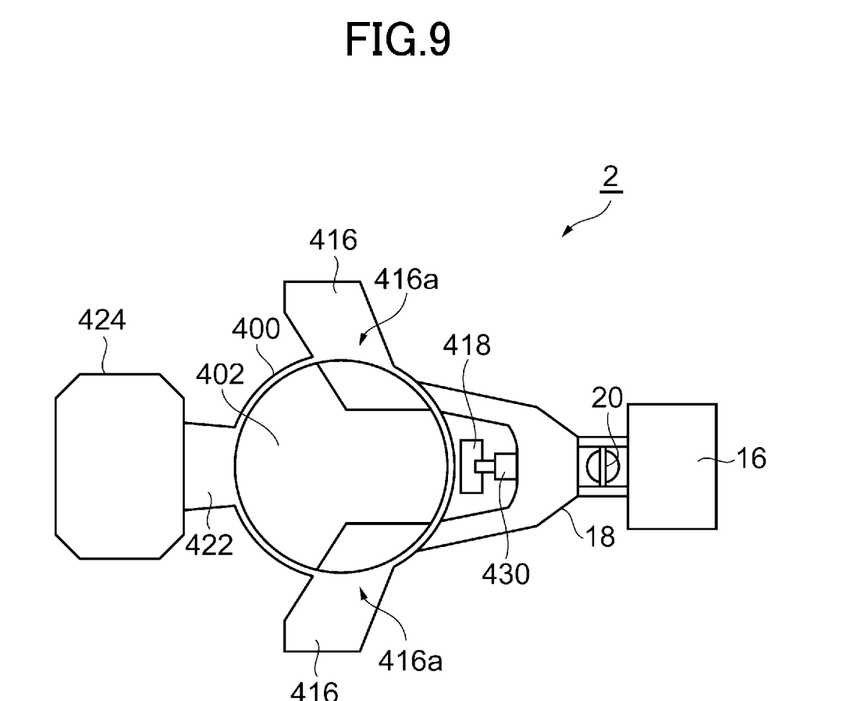
FIG. 9 shows a plan view of the two-stroke engine of FIG. 8 and is a view in which a top portion of a cylinder is not shown.

FIGS. 8 and 9 show an engine in which the 2-st engine 4 is provided with a booster port 418*a*. In the scavenging stroke, both the scavenging passage 416 and a booster passage 418 communicate with the combustion chamber 408 and the crank chamber 420 and supply the air-fuel mixture pre-compressed in the crank chamber 420 to the combustion chamber 408. Both the booster port 418*a* and the scavenging port 416*a* opened into the combustion chamber 408 of the scavenging passage 416 are opened and closed by the piston 402.

The leading air and the air-fuel mixture discharged from the scavenging port 416*a* are directed to the side opposite to the exhaust port 422. On the other hand, the air-fuel mixture discharged from the booster port 418*a* is directed upward, i.e., toward a top portion of the combustion chamber 408.

As shown in FIGS. 8 and 9, the fuel injection valve 430 is preferably arranged at or near an inlet portion 418*b* of the booster passage 418. By arranging the fuel injection valve 430 at or near the inlet portion 418*b* of the booster passage 418, roughly two engine control modes can selectively be performed by changing the fuel injection timing as described next with reference to FIG. 10.

<Switching of Engine Control Mode Between Engine Cold Period and Engine Warm Period>

The control of the 2-st engine 4 shown in FIGS. 8 and 9 may have a stratified combustion mode and a homogeneous combustion mode (steady operation mode). The stratified combustion mode is performed with the throttle full open when the scavenging port 416*a* and the booster port 418*a* are closed at the fuel injection timing of the fuel injection valve 430 arranged at the inlet portion 418*b* of the booster passage 418. For example, a fuel injection is started when the piston 402 is located at the top dead center, and the fuel injection is performed until the piston 402 descends partway from the top dead center. Since the fuel injection is performed before the scavenging stroke is executed, the air-fuel mixture (mixed fuel) injected from the fuel injection valve 430 is supplied to the crank chamber 420, pre-compressed in the crank chamber 420, and then supplied to the combustion chamber 408. In this stratified combustion mode, the air-fuel ratio of the air-fuel mixture injected from the fuel injection valve 430 is set to be relatively or absolutely rich.

The homogeneous combustion mode (steady operation mode) is performed when the scavenging port 416*a* and the booster port 418*a* are open at the fuel injection timing of the fuel injection valve 430 with the throttle full open, i.e., in the scavenging stroke. Since the fuel injection is performed when the scavenging stroke is executed, the air-fuel mixture (mixed fuel) injected from the fuel injection valve 430 is supplied through the booster passage 418 to the combustion chamber, accompanying a scavenging air pre-compressed in the crank chamber 420, and the air-fuel mixture supplied to the combustion chamber 408 from the booster port 418*a* rises in the combustion chamber 408 and intensively fills a periphery of the spark plug 410. In this homogeneous combustion mode, the air-fuel ratio of the air-fuel mixture injected from the fuel injection valve 430 is set to be leaner than at least that of the stratified combustion mode. Specifically, in the homogeneous combustion mode, which is the steady operation mode, the air-fuel ratio in the homogeneous fuel mode with the fuel injection performed in the scavenging stroke is preferably set to be relatively or absolutely lean so as to reduce the blow-by in the scavenging stroke.

The homogeneous combustion mode (steady operation mode) and the stratified combustion mode are summarized as follows.

(1) Homogeneous Combustion Mode (Steady Operation Mode):

The throttle valve 20 is fully opened. The fuel injection is performed in the scavenging stroke. The air-fuel mixture is relatively or absolutely lean.

(2) Stratified Combustion Mode:

The throttle valve 20 is fully opened. The fuel injection is performed in a process other than the scavenging stroke. The air-fuel mixture is relatively or absolutely rich.

Figure 10:
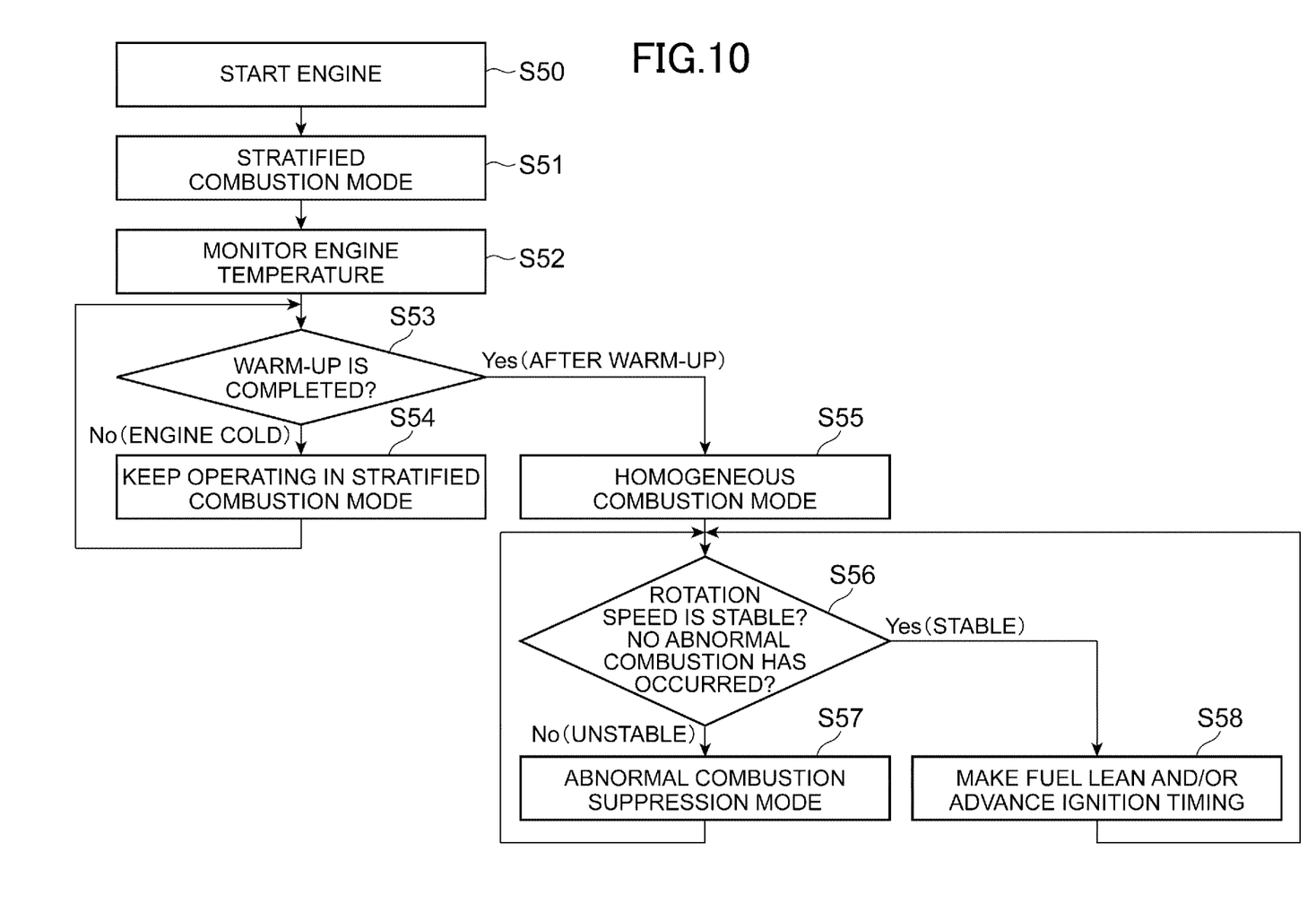
FIG. 10 is a flowchart for explaining a control example of changing from an engine control mode during engine cold period to an engine control mode during engine warm period when engine warm-up is completed in the engine shown in FIGS. 8 and 9.

A process related to switching of the engine control mode between engine cold period and engine warm period will be described with reference to a flowchart of FIG. 10. The 2-st engine 4 is started (S50) based on the engine start control signal (S4) described with reference to FIG. 4. Immediately after the engine 4 starts, the 2-st engine 4 is controlled in the stratified combustion mode with the throttle full open (S51). Immediately after the engine starts, the monitoring of the engine temperature is continued (S52), and in next step S53, it is determined whether warm-up of the engine 4 is completed, and the stratified combustion mode is continued in step S54 until the warm-up of the engine 4 is completed.

When the warm-up of the engine 4 is completed, the process goes from step S53 to step S55, and the control of the 2-st engine 4 is switched from the stratified combustion mode to the homogeneous combustion mode with maintaining the throttle fully open. As a result, the engine 4 is operated under a lean air-fuel ratio during engine warm period. In next step S56, it is determined whether the engine rotation speed is stable, and when the engine rotation speed is unstable, an abnormal combustion suppression mode is performed as in the process of step S13 of FIG. 5 etc.

When it is determined in step S56 that the engine rotation speed of the 2-st engine 4 with the throttle full open is stable, the process goes to step S58 to perform a process of making the air-fuel mixture leaner and/or advancing the ignition timing. This process is continued until the rotation speed of the engine 4 becomes unstable.

Although the embodiments of the present invention have been described based on an example in which the series hybrid device 2 is applied to a ridge mowing robot, the series hybrid device 2 according to the present invention can be used as power sources for drones and radio-controlled airplanes spraying pesticides, outboard engines, robot management machines, cogeneration devices, ball pickers collecting golf balls at golf courses and returning the balls to a collection site, self-propelled blower robots, self-propelled vacuum robots, etc.

2 series hybrid device of embodiment
4 2-st engine
6 generator
8 battery
10 front wheel motor (running motor)
12 rear wheel motor (running motor)
14 cutting blade motor (working motor)
18 intake system
20 throttle valve
22 throttle motor
24 control unit
28 ECU of control unit
30 charge/discharge control part of control unit
400 cylinder of 2-st engine
402 piston
406 crankshaft
408 combustion chamber
408*a* top surface of combustion chamber (top surface defining a flat dome-shaped combustion chamber)
410 spark plug
414 intake port
416 scavenging passage
416*a* scavenging port
418 booster passage
418*a* booster port
420 crank chamber
422 exhaust port
430 fuel injection valve
440 group of sensors
442 engine control part of control unit

What is claimed is:

1. A two-stroke engine for a working machine in a series hybrid device that includes an internal combustion engine, a generator connected to the internal combustion engine, a battery for storing electric power generated by the generator, and one or more motors operating with electric power supplied from the battery and that constitutes a power source for a working machine,
the two-stroke engine constituting the internal combustion engine incorporated in the series hybrid device,
the two-stroke engine comprising:
a throttle motor for driving a throttle valve disposed in an intake system;
a fuel injection device disposed in the intake system including a crank chamber and injecting fuel into the intake system; and
a control unit controlling the throttle motor and the fuel injection device, wherein
the two-stroke engine is designed to achieve an engine rotation speed of 4,500 rpm to 7,000 rpm with a state where the throttle valve is fully opened, wherein
the two-stroke engine is operated with the throttle full open by the control unit, and wherein
the battery is charged with electric power generated by the generator using the two-stroke engine.

2. The two-stroke engine for a working machine according to claim 1, wherein the generator is operated as a starting motor by the electric power supplied from the battery so that the two-stroke engine is started by the generator.

3. The two-stroke engine for a working machine according to claim 1, wherein
the fuel injected from the fuel injection device is a mixed fuel containing a lubricating oil, and wherein
the two-stroke engine is operated with the throttle full open immediately after the two-stroke engine is started.

4. The two-stroke engine for a working machine according to claim 1, wherein
the control unit includes an air-fuel ratio control part controlling an air-fuel ratio of the fuel discharged by the fuel injection device, and wherein
a full-throttle engine output is controlled by controlling the air-fuel ratio of the fuel.

5. The two-stroke engine for a working machine according to claim 1, wherein the full-throttle engine output is controlled by controlling an ignition timing of a spark plug of the two-stroke engine.

6. The two-stroke engine for a working machine according to claim 1, wherein the two-stroke engine for a working machine is a stratified scavenging engine.

7. The two-stroke engine for a working machine according to claim 1, wherein the two-stroke engine is a square stroke engine or a long stroke engine having a bore stroke ratio of 1 or more.

8. The two-stroke engine for a working machine according to claim 1, further comprising a flat dome-shaped combustion chamber, wherein
an engine compression ratio is 12.0 to 16.0.

9. A series hybrid device for a working machine incorporating the two-stroke engine for a working machine according to claim 1.

10. The series hybrid device for a working machine according to claim 9, wherein
the motor included in the series hybrid device and operating with electric power supplied from the battery is made up of a working motor, and wherein
the two-stroke engine operates with the throttle full open so that the battery is charged, while the working motor is operating.

11. The series hybrid device for a working machine according to claim 9, wherein
the working machine is a running working machine, wherein
the motor included in the series hybrid device and operating with electric power supplied from the battery is made up of a running motor for the working machine to run, wherein
the two-stroke engine operates with the throttle full open so that the battery is charged, while the running motor is operating.

12. The series hybrid device for a working machine according to claim 9, wherein
the working machine is a running working machine, wherein
the motors included in the series hybrid device and operating with electric power supplied from the battery include a running motor for the working machine to run and a working motor for the working machine to work, wherein
the two-stroke engine operates so that the battery is charged only while at least one of the running motor and the working motor is operating.

13. The series hybrid device for a working machine according to claim 9, wherein
the control unit includes a charge/discharge control part controlling charge/discharge of the battery, wherein
when a power consumption of the battery is larger than a charging power, the two-stroke engine is controlled to increase the engine output through an air-fuel ratio of an air-fuel mixture and/or an ignition timing with the throttle full open.

14. The two-stroke engine for a working machine according to claim 1, wherein
The control unit has an air-fuel ratio control unit control part controlling the air-fuel ratio of the engine by controlling an injection amount of fuel discharged by the fuel injection device and an injection time for each cycle, wherein
the two-stroke engine has a homogeneous combustion mode and a stratified combustion mode as control modes, wherein
in the homogeneous combustion mode, fuel injection is performed in a scavenging stroke, wherein
in the stratified combustion mode, fuel injection is performed in a process other than the scavenging stroke, and wherein
the air-fuel ratio in the homogeneous combustion mode is leaner than the air-fuel ratio in the stratified combustion mode.

15. The two-stroke engine for a working machine according to claim 14, wherein the homogeneous combustion mode is performed during engine warm period, and the stratified combustion mode is performed during engine cold period.

16. The two-stroke engine for a working machine according to claim 14, further comprising
a booster port directing an air-fuel mixture to a top portion of a combustion chamber in the scavenging stroke, and
a booster passage allowing the booster port to communicate with the crank chamber, wherein
the fuel injection device is disposed at or near an inlet of the booster passage.

* * * * *